(12) United States Patent
McIntyre et al.

(10) Patent No.: US 7,050,994 B1
(45) Date of Patent: May 23, 2006

(54) METHOD OF SHARING IMAGES ALLOWING THIRD PARTY PRINT ORDERS VIA A WEB SITE

(75) Inventors: Dale F. McIntyre, Honeoye Falls, NY (US); Thomas D. Jensen, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/717,448

(22) Filed: Nov. 20, 2000

(51) Int. Cl.
*G06F 17/00* (2006.01)

(52) U.S. Cl. ..................................................... 705/26

(58) Field of Classification Search ................ 705/26, 705/27, 40; 358/442, 487; 396/6, 429; 235/380; 355/40, 48; 710/52
See application file for complete search history.

(56) References Cited

U.S. PATENT DOCUMENTS

| | | | |
|---|---|---|---|
| 4,949,117 A | | 8/1990 | Van Heyningen et al. |
| 5,113,351 A | | 5/1992 | Bostic |
| 5,191,611 A | | 3/1993 | Lang |
| 5,619,275 A | | 4/1997 | Tults |
| 5,666,215 A | * | 9/1997 | Fredlund et al. ............. 358/487 |
| 5,760,917 A | * | 6/1998 | Sheridan ..................... 358/442 |
| 5,799,219 A | | 8/1998 | Molghadam et al. |
| 5,801,856 A | | 9/1998 | Moghadam et al. |
| 5,822,625 A | | 10/1998 | Leidig et al. |
| 5,845,166 A | * | 12/1998 | Fellegara et al. ........... 396/429 |
| 5,923,906 A | * | 7/1999 | Zander ........................... 396/6 |
| 5,940,121 A | | 8/1999 | McIntyre |
| 5,965,859 A | * | 10/1999 | DiVincenzo et al. ........ 235/380 |
| 5,974,401 A | * | 10/1999 | Enomoto et al. ............. 705/40 |
| 6,017,157 A | | 1/2000 | Garfinkle et al. |
| 6,104,885 A | * | 8/2000 | McIntyre et al. ........... 396/319 |
| 6,133,985 A | * | 10/2000 | Garfinkle et al. ............ 355/40 |
| 6,167,469 A | * | 12/2000 | Safai et al. .................... 710/62 |
| 6,321,231 B1 | * | 11/2001 | Jebens et al. ............ 707/104.1 |
| 6,324,521 B1 | * | 11/2001 | Shiota et al. ................. 705/27 |
| 6,578,072 B1 | * | 6/2003 | Watanabe et al. ........... 709/217 |
| 6,657,702 B1 | * | 12/2003 | Chui et al. ..................... 355/40 |

FOREIGN PATENT DOCUMENTS

| | | |
|---|---|---|
| EP | 0 864 916 | 9/1998 |
| JP | 09259189 A * | 10/1997 |

OTHER PUBLICATIONS

"Dotphoto" screen shots captured via the WayBackMachine and dated Aug. 15, 2000.*
"Dotphoto, Inc. allows Users to Operate E–Commerce Profit Centers", PR Newswire; New York; Aug. 23, 2000.*
"Snappy Answers; What to do with that shoe box of Photos? The web and Digital Technology Power a Revolution in Photo Processing, Distribution and Display"; Katherine Foran; Chicago Tribune; Oct. 5, 2000.*
dotphoto.com web pages captured via the WayBack Machine (www.archieve.org); Aug. 15, 2000.*
dotphoto.com web pages captured via the WayBack Machine; Aug. 15, 2000.*

* cited by examiner

*Primary Examiner*—Jeffrey A. Smith
*Assistant Examiner*—R. E. Rhode, Jr.
(74) *Attorney, Agent, or Firm*—Frank Pincelli

(57) ABSTRACT

A method of providing image goods and/or services to more than one party located at different locations. The method includes providing a camera for substantially simultaneously capturing an image both electronically and on a photosensitive media by a customer and transmitting the electronic image to a third party at a location remote from the customer along with additional data. The additional data identifying the image with respect to the photosensitive media. The customer and/or the third party placing an order with a service provider for at least one good and/or service with respect to the image. The service provider assembles the order upon receipt of the photosensitive media.

8 Claims, 9 Drawing Sheets

40 — SERVICE PROVIDER "XYZ"

NAME: JOHN DOE
ADDRESS: 123 PRIMROSE LANE, USA
CASSETTE CID/FID NUMBER: 958-348
CREDIT CARD NUMBER: 1234 4678 9101 1121   EXP.: 1/2003

42 —

| PRINT ORDER: | IMAGE | QTY | COST | TOTAL |
|---|---|---|---|---|
| 3X5 | 5 | 3 | $0.85 | $2.55 |
| 5X7 | 24 | 2 | $1.65 | $3.30 |
| 8X10 | | | | |
| 11X14 | | | | |
| POSTED | 8 | 1 | $24.95 | $24.95 |
| SUBTOTAL | | | | $ 29.80 |

44 —

| NOVELTY ITEMS: | IMAGE | QTY | COST | TOTAL |
|---|---|---|---|---|
| T-SHIRT | 2 | 10 | $18.95 | $189.50 |
| CALENDER | 15 | 10 | $7.95 | $ 79.50 |
| MUG | 12 | 10 | $8.95 | $ 89.50 |
| SUBTOTAL | | | | $358.50 |
| | | | TOTAL: | $358.50 |

46 — SHARE ATTACHED IMAGES WITH THIRD PARTY:

BILL@XYZ.COM
SONJA@ABC.NET
GRANDMA@CROWSNEST.PYNY

FIG. 5

METHOD OF SHARING IMAGES ALLOWING THIRD PARTY PRINT ORDERS VIA A WEB SITE

CROSS REFERENCE TO RELATED APPLICATIONS

Reference is made to commonly-assigned U.S. patent application Ser. No. 09/577,094, filed May 24, 1999, entitled "DUAL FILM IMAGE AND ELECTRONIC IMAGE CAPTURE CAMERA WITH ELECTRONIC IMAGE VERIFICATION OF FILM IMAGE MISFOCUS" to Stephen G. Malloy Desormeaux; commonly-assigned U.S. patent application Ser. No. 09/470,216, filed Dec. 22, 1999, entitled "METHOD AND SYSTEM FOR ORGANIZING IMAGES" to Dale F. McIntyre and Joseph A. Manico; commonly-assigned U.S. patent application Ser. No. 09/470,938, filed Dec. 22, 1999, entitled "A KIT FOR ORGANIZING A PLURALITY OF IMAGES" to Dale F. McIntyre et al.

FIELD OF THE INVENTION

This invention relates to the field of photography, and in particular, to a method of sharing low resolution electronic images to create print orders in advance of a service provider receiving high resolution printable images.

BACKGROUND OF THE INVENTION

Photographers like to share pictures. In fact, a major reason photographers take pictures is to share them with friends, family and co-workers. One current method to share pictures includes ordering multiple sets of prints giving the user multiple prints of every picture on the roll whether the photographer considers them good enough for sharing or not. This approach is costly for the photographer and limits them to sharing with just a few individuals.

Another method of sharing pictures is to order reprints of only those pictures desired. This occurs after the original film has been processed, printed, and reviewed by the photographer. The photographer must then return the negatives to a retailer for selective reprints. This is not cost or time efficient. Reprints are usually more expensive than the original prints, in part because of the extra handling of the previously processed film. In addition, time is of the essence when sharing images. Often an inordinate amount of time passes between the original picture talking and the moment the photographer "gets around" to placing the reprint order and finally receiving the reprint. And then occasionally, the original is given away with intention of reprinting the photo later. Many times the process of ordering reprints never happens because it is not convenient, or it is put off so long that it is not as important as it first was. Missing such an opportunity to share memories with others is a moment that can be lost forever.

More recently, service providers have been offering on-line photographic services. On-line photographic services include image digitization, digital image storage, and distribution of digital image files. These are all currently provided by on-line service providers such as the KODAK PhotoNet™ online service, available on the Internet at http://kodak.photonet.com.

However, this is still not necessarily the most convenient way to share pictures. The on-line process entails communicating to the people you want to share the images with, what and where the web site is, what the password is, where the images you want them to look at reside etc. The process is complex for the average person and may not be intuitive.

The present invention resolves many of the problems of the prior art in that there is provided a system for easy access to the results of a photographic event and the ability for multiple parties to conveniently order all of the desired images prior to the first printing of any image thus avoiding the complex reprint process.

These and other aspects, objects, features and advantages of the present invention will be more clearly understood and appreciated from a review of the following detailed description of the preferred embodiments and appended claims, and by reference to the accompanying drawings.

SUMMARY OF THE INVENTION

In accordance with one aspect of the present invention there is provided a method of providing image goods and/or services to more than one party located at different locations, comprising the steps of:

providing a camera for substantially simultaneously capturing an image both electronically and on a photosensitive media by a customer;

transmitting the electronic image to a third party at a location remote from the customer along with additional data, the additional data identifying the image with respect to the photosensitive media;

the customer and/or the third party having the ability for placing an order with a service provider for at least one good and/or service with respect to the image on the photosensitive media associated using the electronic image prior to the service provider receiving the high resolution image; and the service provider assembling the order upon receipt of the photosensitive media.

In accordance with another aspect of the present invention there is provided a method of providing image goods and/or services to a plurality of customers located at different locations, comprising;

providing a camera for substantially simultaneously capturing an image both electronically and on a photosensitive media by a customer, the electronic image comprising a predetermined image resolution, the camera having a selection switch for identifying that digital images are to be forwarded to a third party for ordering of goods and/or services made using the photosensitive media;

transmitting the electronic images to the third party along with identifying data with respect to the images transmitted;

the third party placing an order for goods and/or services with respect to the images on the photosensitive media using the digital images from which the order may be placed; and the information being forwarded to the service provider prior to execution of providing goods and/or services with respect to images on the photosensitive media.

In accordance with yet another aspect of the present invention there is provided a method of providing image goods and/or services to more than one party located at different locations, comprising the steps of:

providing a camera for capturing a high resolution image by a photographer;

transmitting a low resolution electronic image to a third party at a location remote from the photographer along with additional data, the additional data identifying the low resolution electronic image with respect to the high resolution image;

the customer and/or the third party having the ability for placing an order with a service provider for at least one good and/or service with respect to the high resolution image associated using the low resolution electronic image prior to the service provider receiving the photosensitive media; and the service provider assembling the order upon receipt of the high resolution image.

BRIEF DESCRIPTION OF THE DRAWINGS

In the detailed description of the preferred embodiments of the invention presented below, reference is made to the accompanying drawings in which:

FIG. 5 is a representation of computer screen wherein an order is placed in accordance with the present invention.

DETAILED DESCRIPTION OF THE INVENTION

Figure 1A:
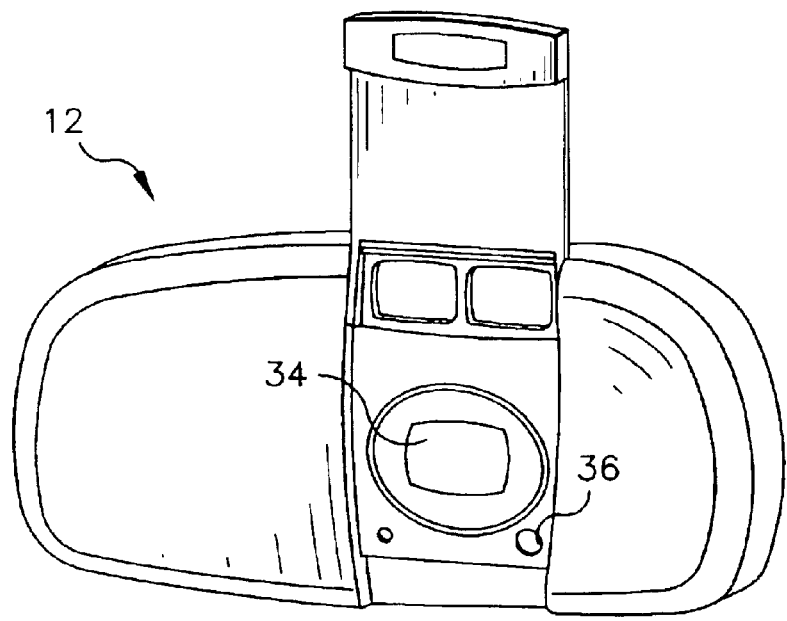
FIG. 1A is a perspective view of a hybrid camera
Figure 2A:
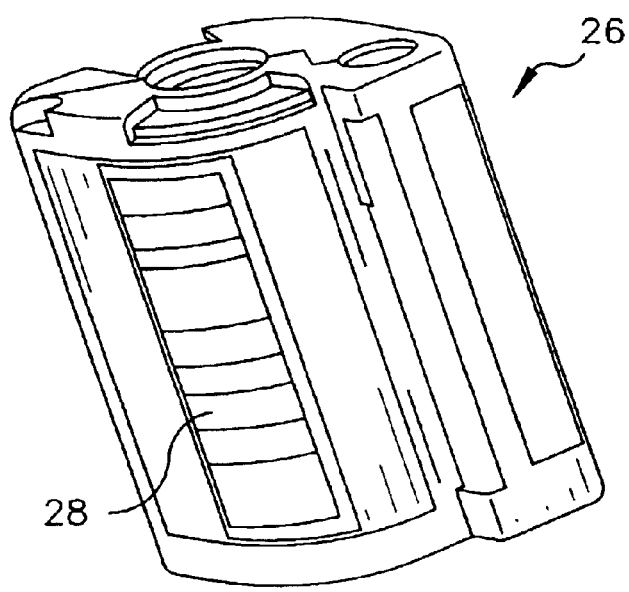
FIG. 2A is a back view of an Advanced Photo System film cassette
Figure 2B:
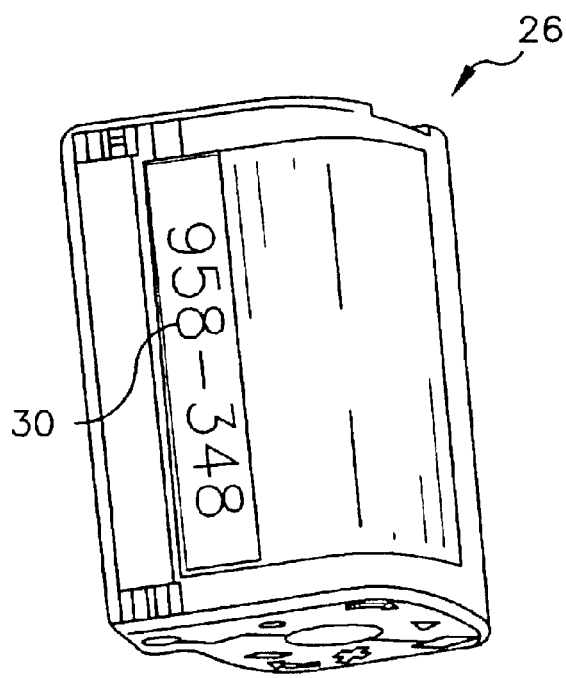
FIG. 2B is a front view of an Advanced Photo System film cassette

Turning to FIG. 1A, a perspective view of a hybrid camera 12 is shown. Hybrid cameras are described in detail in U.S. Pat. Nos. 5,822,625; 5,619,275 and 4,949,117 which are hereby incorporated by reference. Briefly, the hybrid camera 12 includes an optical exposing assembly 34 for focussing and exposing a silver halide filmstrip operationally contained within a film cassette 26 (See FIGS. 2A and 2B). The film cassette 26, of course, is capable of being operationally loaded into hybrid camera 12. Hybrid camera 12 also includes an optical assembly 36 for substantially simultaneously focussing and electronically exposing the same scene as is captured on the silver halide filmstrip via optical exposing assembly 34. Controls (not shown) included in the hybrid camera 12 cause the simultaneous actuation of both assemblies 34 and 36 creating two correlated exposures of the same scene on the two different capture media. It will be understood that the data correlating the film image with the electronic image will be stored with or appended to the electronic image as will be discussed later with respect to FIGS. 2A and 2B. Hybrid camera 12 further includes an electronic display (not shown) which permits the photographer 10 (See FIG. 3) to review the electronic image correlated to the image captured on the silver halide film without the use of a computer or other image display device.

Figure 1B:
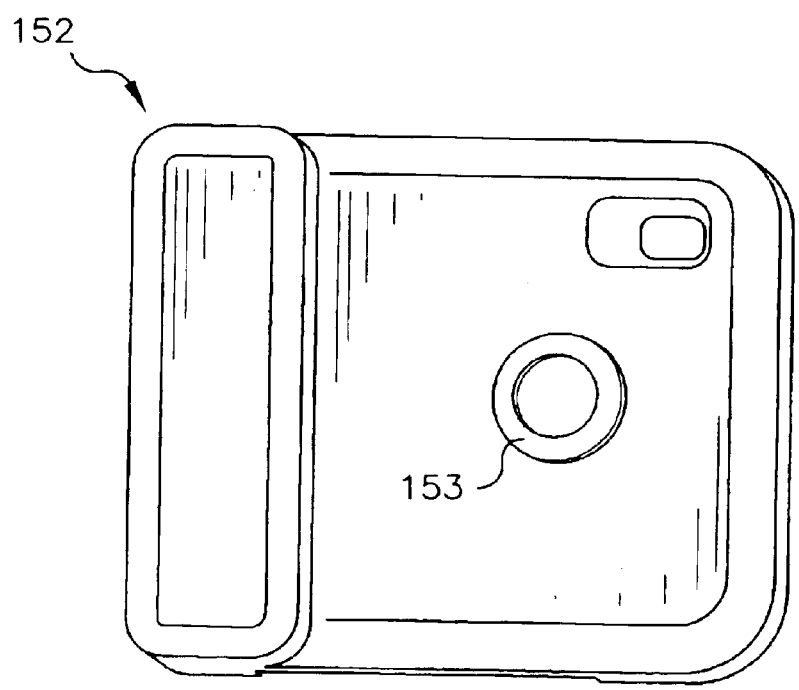
FIG. 1B is a perspective view of a digital camera

Turning to FIG. 1B, a perspective view of a digital camera 152 is shown. Briefly, digital cameras are well understood in the art and include optical assembly 153 for focussing and electronically exposing the scene to be captured on an image sensor (not shown) producing a high resolution electronic image capable of being printed with adequate quality. It will be understood that each captured image is typically given a filename by the digital camera 152 which can be a unique code. For example, the unique code can be generated from the combination of the serial number of the digital camera 152 and the sequential exposure number. The unique code is stored with the high resolution electronic image information in well understood digital picture formats such as EXIF and JPEG2000. Any derivation of the high resolution electronic image such as a thumbnail or low resolution electronic image maintains this unique code which is instrumental in compiling a print order in accordance with the present invention. Typically a low resolution digital image is primarily suitable for display on an electronic device such as a CRT but not well suited for producing high quality prints comparable to standard photographic prints. An example of a low resolution VGA image would comprise 640×480 pixels Turning now to FIG. 2A, a film cassette 26 is shown which is identified by a unique number encoded in a machine readable code 28 such as a bar code found on the exterior of the cartridge. For the sake of clarity, film cassette 26 is shown as an Advantix film cassette sold and marketed by the Eastman Kodak Company as part of the Advanced Photo System. Similarly in FIG. 2B, film cassette 26 also includes a human readable code 30 which represents the same identification of film cassette 26. The machine readable code 28 allows automated scanning and identification by a computer system while the human readable code 30 allows a manual identification or confirmation of the automated scanning of machine readable code 28. In co-operation with the frame number of the film, these codes identify both the film cassette 26 and the frame number of an image that is desired to be shared, stored or printed. The electronic image captured hybrid camera 12 is stored in a temporary internal memory (not shown) of the hybrid camera 12. As is well understood in the art, many image file formats are possible to use such as EXIF, JPEG2000, and specialized XML descriptions which permit the inclusion of metadata such as the cartridge ID/frame number combination with the actual picture data. In accordance with the present invention, the cartridge ID/frame number combination are stored with the electronic images and are transmitted with those images for use in the creation of a print order.

Figure 3A:
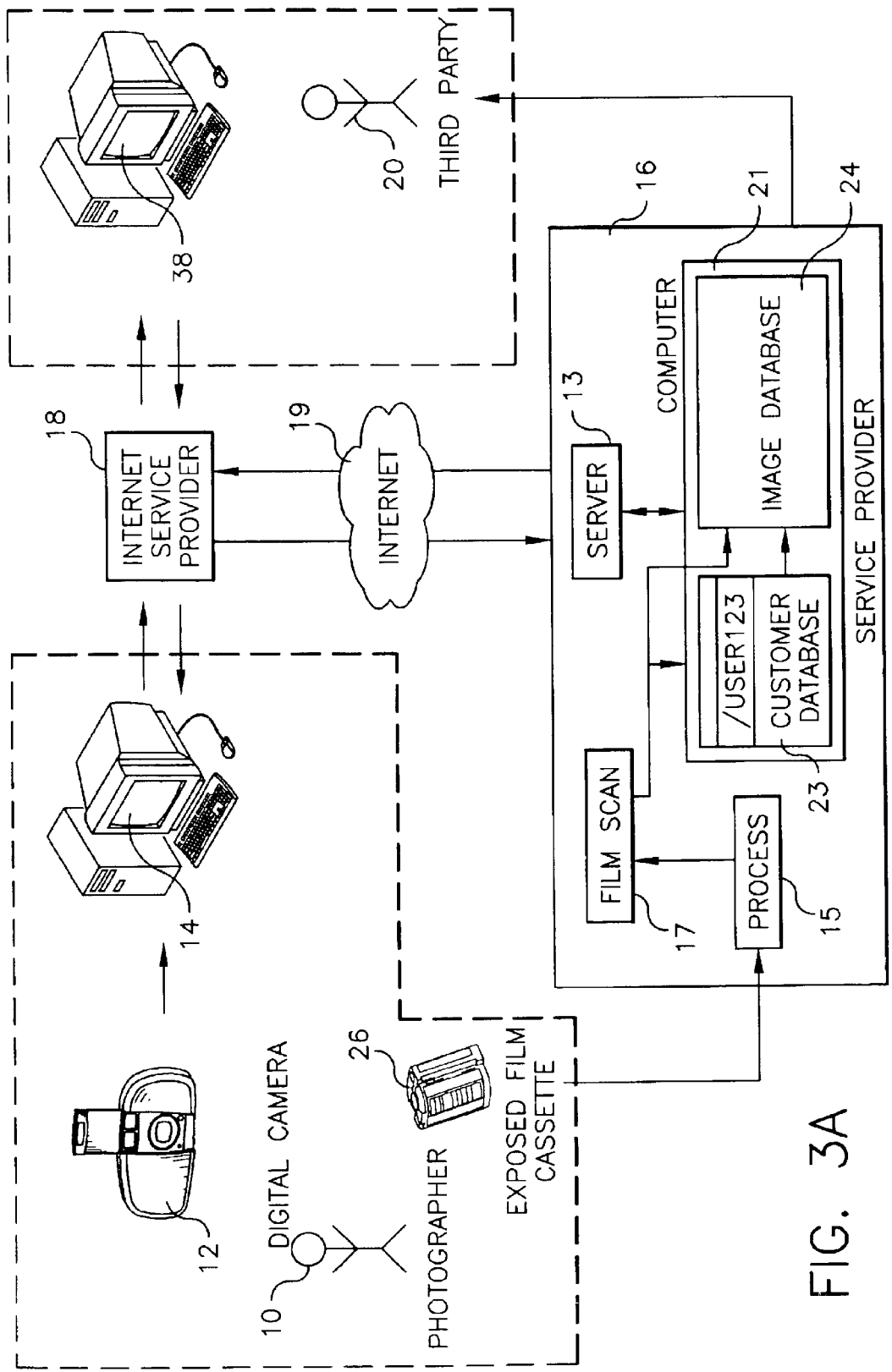
FIG. 3A is a system diagram including a hybrid camera in accordance with the present invention.

Turning to FIG. 3A, photographer 10 begins taking pictures with the hybrid camera 12 exposing the silver halide film contained within film cassette 26. At a point prior to delivering the film cassette 26 for processing at a service provider 16, the photographer 10 chooses to share the electronic images corresponding to the exposed, unprocessed silver halide images with a third party 20 which could be a friend or a relative or other acquaintance of their choosing. The choice of which images to share can be done using the image display included on the camera or with an image display system 14 as shown in FIG. 3A. It will be understood that the image display system 14 may be a personal computer with a monitor such as the various models manufactured by Dell Computer, a cable set top box such as the Explorer 2010 digital set top box manufactured by Scientific Atlanta connected to a television set, or a personal digital assistant such as a Palm IIIc manufactured by Palm Computing Inc. Likewise, image display system 38 belonging to the third party 20 can be any of the aforementioned systems that is operably connected to a network such as the Internet 19. Using image display system 38, third party 20 connects to a computer 21 for the purpose of placing a print order. It should be noted that third party 20 may actually be multiple people at multiple physical locations.

Continuing with FIG. 3A, a service provider 16 is shown operably connected to the Internet 19 via server 13 and computer 21. Service provider 16 as shown in FIG. 3 includes film processing block 15 for reading the machine readable code 28 and chemically processing the film and film scanning block 17 for creating the high resolution digital image files for fulfilling print orders. It should be noted that service provider 16 does not necessarily need to include film processing and scanning capabilities rather receiving the high resolution digital image files from a remote location such as a retail store with a digital minilab such as the Model 2711 manufactured by Noritsu. Computer 21 further includes an image database 24 for receiving high resolution digital image files and a customer database 23 for receiving information about a customer including print orders, payment information and delivery information.

Figure 3B:
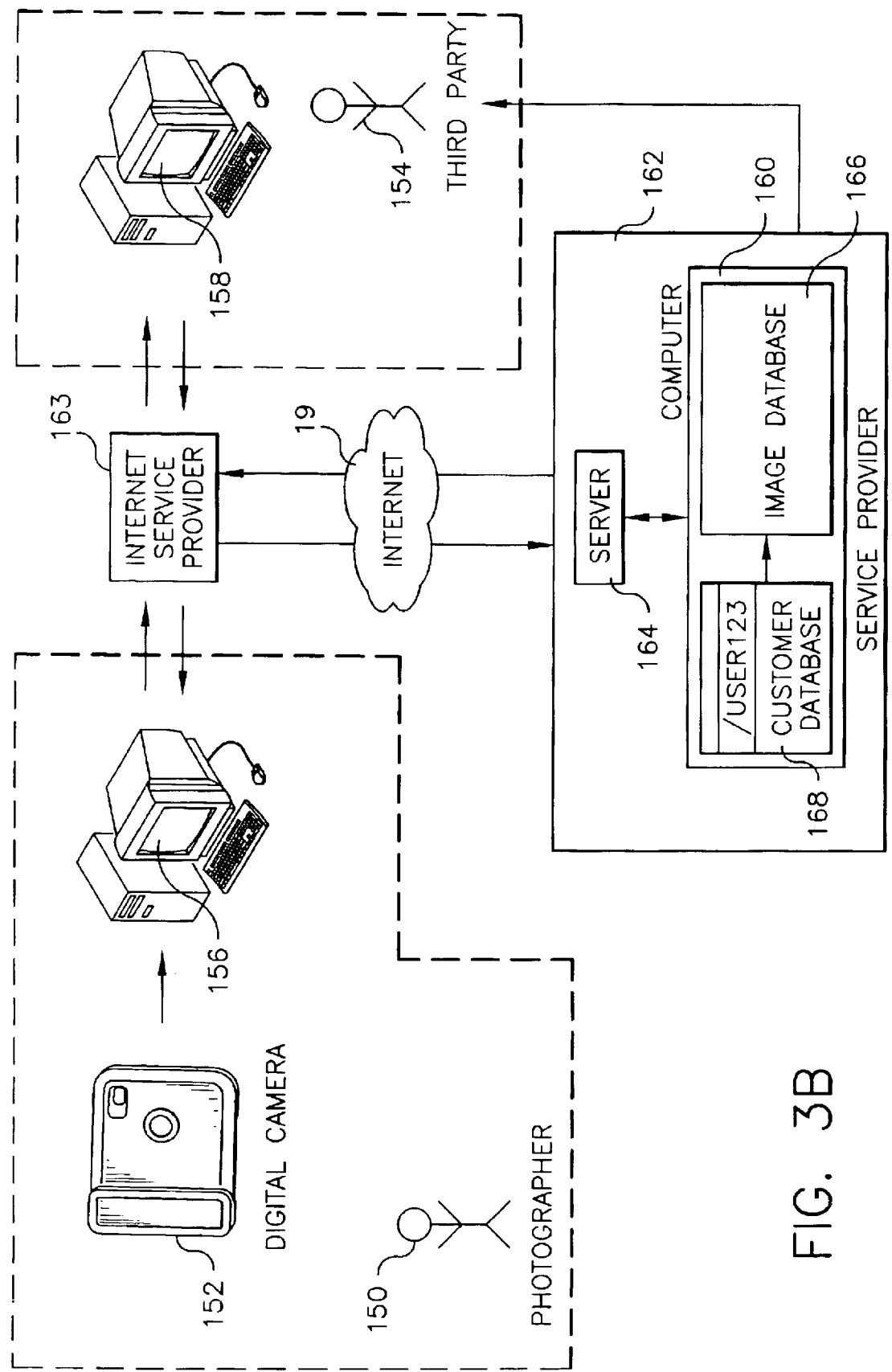
FIG. 3B is a system diagram including a digital camera in accordance with the present invention.

Turning to FIG. 3B like parts indicating like operation, photographer 150 begins taking pictures with the digital camera 152. At a point prior to uploading the high resolution images captured by digital camera 152 for processing at a service provider 162, the photographer 150 chooses to share the low resolution electronic images typically referred to as thumbnail images with a third party 154 which could be a friend or a relative or other acquaintance of their choosing. The low resolution electronic images are tagged by the digital camera 152 with a unique code that can be generated, for example, by a combination of the camera's serial number and the sequential exposure number. This unique code may also include customer identification and/or customer address. This unique code stored and transmitted with the low resolution electronic images is also maintained with the high resolution electronic images for identification later of the specific images that belong to a print order. It is of course understood that any other information may also be provided as desired for associating an order with the customer and/or third party recipient of the image order.

The choice of which images to share can be done using the image display (not shown) included on the digital camera 152 or with an image display system 156 as shown in FIG. 3B. It will be understood that the image display system 156 may be a personal computer with a monitor such as the various models manufactured by Dell Computer, a cable set top box such as the Explorer 2010 digital set top box manufactured by Scientific Atlanta connected to a television set or a personal digital assistant such as a Palm IIIc manufactured by Palm Computing Inc. Likewise, image display system 158 belonging to the third party 154 can be any of the aforementioned systems that is operably connected to a network such as the Internet 19. Using image display system 158, third party 154 connects to a computer 160 for the purpose of placing a print order. It should be noted that third party 154 might actually be multiple people at multiple physical locations.

Continuing with FIG. 3B, a service provider 162 is shown operably connected to the Internet 19 via server 164 and computer 160. Service provider 162 as shown in FIG. 3B includes computer 160 for receiving the high resolution electronic images from the photographer 150 for fulfilling print orders. Computer 160 further includes an image database 166 for receiving high resolution digital image files and a customer database 168 for receiving information about a customer including print orders, payment information and delivery information.

Figure 4A:
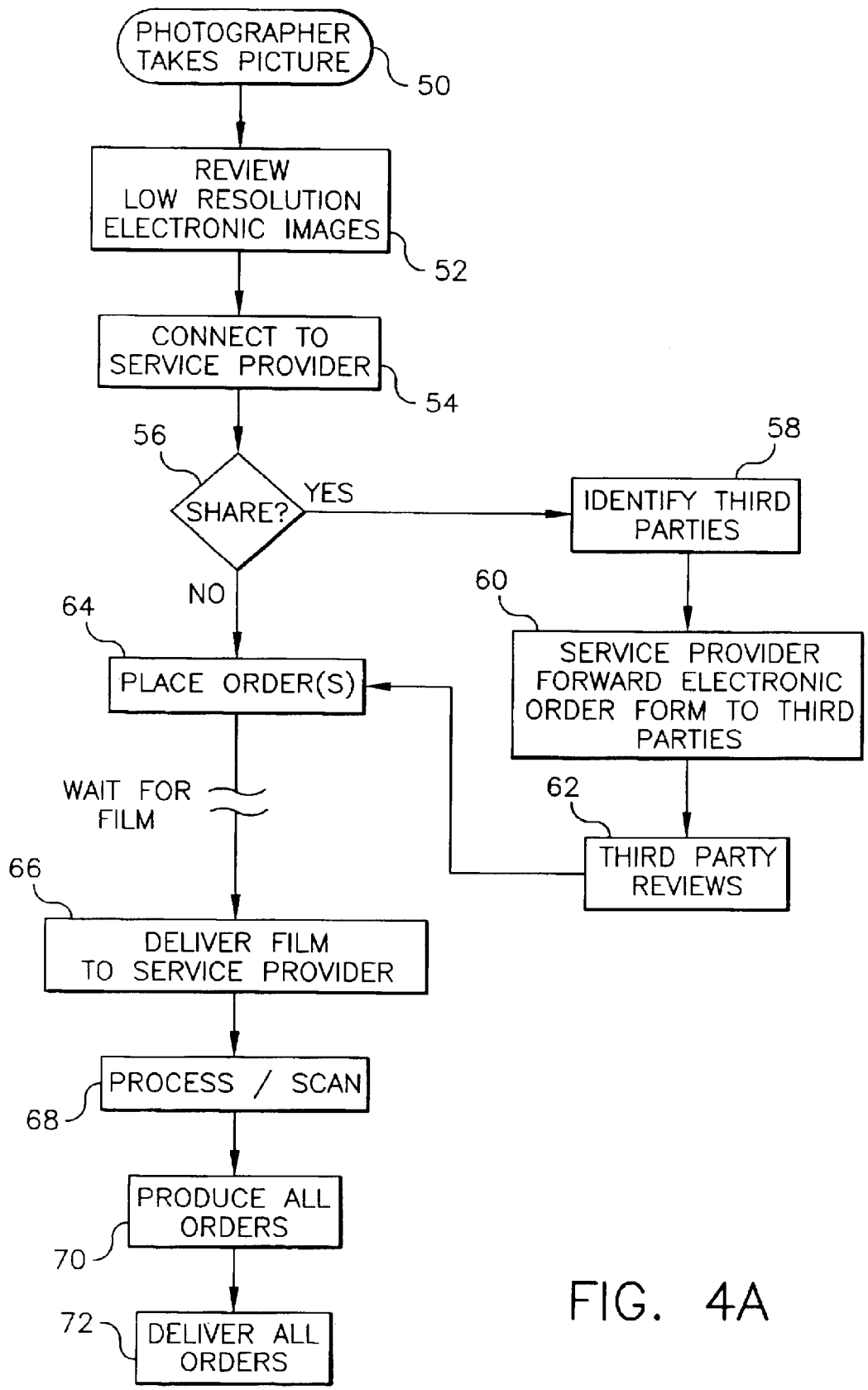
FIG. 4A is a flow chart showing a process for implementing the present invention.

Turning to FIG. 4A, the process begins with photographer 10 taking a picture in step 50. At a future point in time, the photographer 10 chooses to review the low resolution electronic images in step 52 with the display on the hybrid camera 12 or on the image display system 14. Deciding to order prints, photographer 10 connects to service provider 16 in step 54 and has to decide in step 56 whether he intends to share the pictures with third party 20. If so, he inputs the electronic addresses of the intended third parties 20 at step 58. This permits the service provider 16 to create an electronic order form in step 60 to forward to the identified third parties on behalf of photographer 10. The forwarded electronic order form, typically in HTML or XML format, makes it very easy for third parties 20 to reply to and thus create a print order (step 64) with a minimal amount of work after reviewing the shared images in step 62. It is important to note that the print order just created by third party 20 is in advance of service provider 16 receiving APS film cassette 26. Creating the print order in this manner allows service provider 16 to produce the additional prints ordered by third party 20 at the same time as the original print order from photographer 10. This eliminates the need for sharing hardcopy prints and then returning with the negatives to reorder prints at some future date thus saving the photographer 10 a lot of time.

Similarly in FIG. 4A, photographer 10 places his print order in step 64. After receiving film cassette 26 in step 66, service provider 16 processes the film in the knowledge of the unique machine readable code 28 attached to the cartridge in step 68. If optically printing the processed negatives, service provider 16 must look in the customer database 23 (indexing using the unique machine readable code 28) to collect and adjust the print quantity of a high speed optical printer in step 70 to produce all the orders. If printing digitally, step 68 must scan the film and create the high resolution electronic image files needed to create a satisfactory hard copy print. Finally, again indexing the customer database 23 by the unique machine readable code 28 included on the film cassette 26, the service provider 16 sets up the delivery of the print order and delivers the print order in step 72 to the photographer 10 and third parties 20.

Figure 4B:
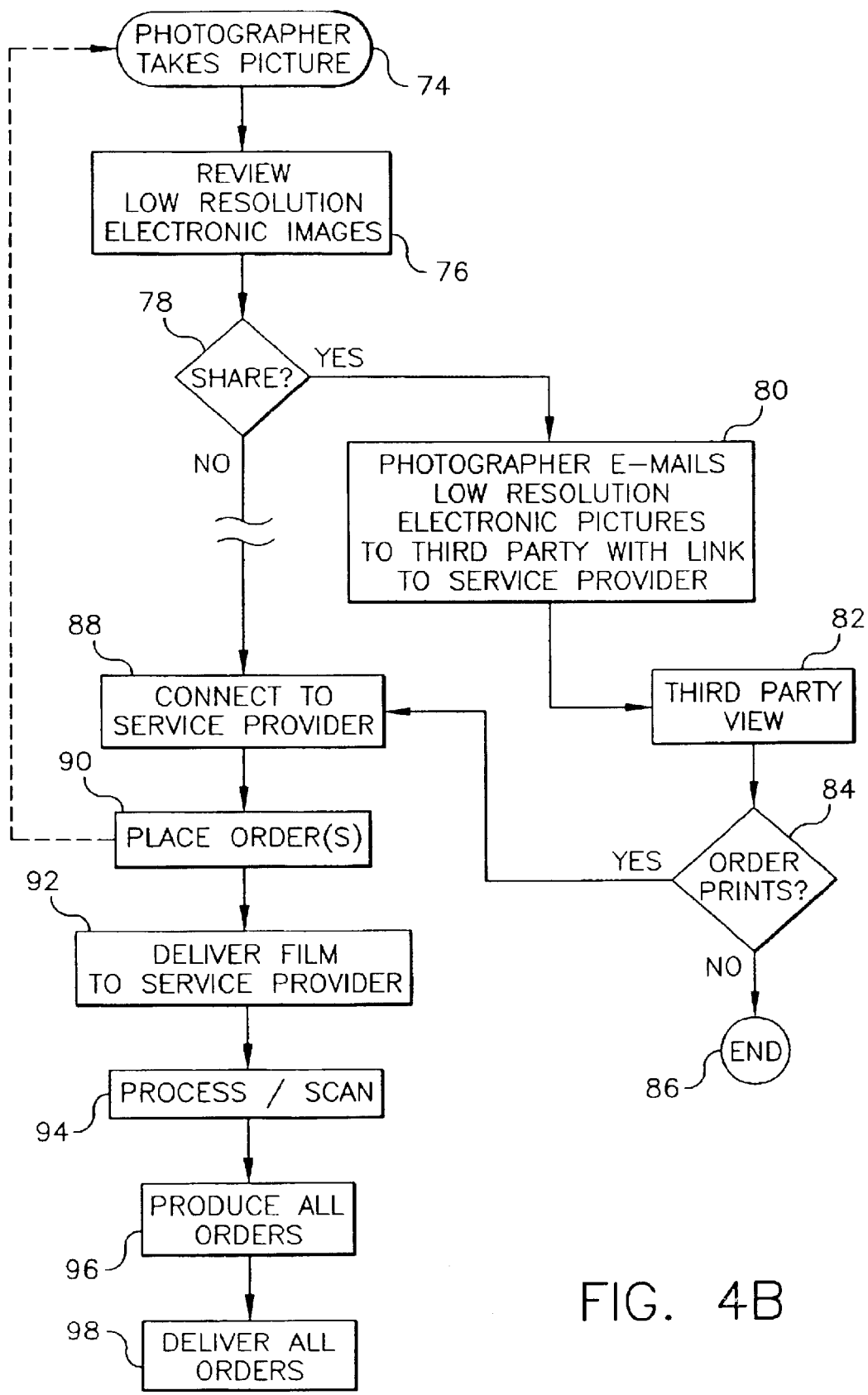
FIG. 4B is a flow chart showing another process for implementing the present invention.

Turning to FIG. 4B, the process begins with photographer 10 taking a picture in step 74. At a future point in time, the photographer 10 chooses to review the low resolution electronic images in step 76 with the display on the hybrid camera 12 or on the image display system 14. Deciding to share (step 78) these images with third party 20, photographer 10 attaches the low resolution electronic images to an email message to third party 20 in step 80. Upon receiving the email attachments, third party 20 views the low resolution electronic images on image display system 38 (step 82) and decides whether or not to order prints in step 84. If the decision is to order prints, third party 20 connects to the service provider 16 which has been identified in the email message (step 88). An order is placed at step 90 by third party 20 and/or photographer 10.

Continuing with FIG. 4B at step 78, photographer 10 has decided not to share and connects to service provider 16 in step 88 and places an order in step 90 with the unique combination of machine readable code and frame number identifying the pictures to print. It is again important to note that the print order just created by third party 20 and/or photographer 10 is in advance of service provider 16 receiving APS film cassette 26. Creating the print order in this manner allows service provider 16 to produce the additional prints ordered by third party 20 at the same time as the original print order from photographer 10. This eliminates the need for sharing hardcopy prints and then returning with the negatives to reorder prints at some future date thus saving the photographer 10 a lot of time. After receiving film cassette 26 in step 92, service provider 16 processes the film (step 94) in the knowledge of the unique machine readable code 28 attached to the cartridge. If optically printing the processed negatives, service provider 16 must look in the customer database 23 (indexing using the unique machine readable code 28) to collect and adjust the print quantity of a high speed optical printer in step 96 to produce all the orders. If printing digitally, step 94 must also scan the film and create the high resolution electronic image files needed to create a satisfactory hard copy print. Finally, again indexing the customer database 23 by the unique machine readable code 28 included on the film cassette 26, the service provider 16 sets up the delivery of the print order and delivers the print order in step 98 to the photographer 10 and third parties 20.

Figure 4C:
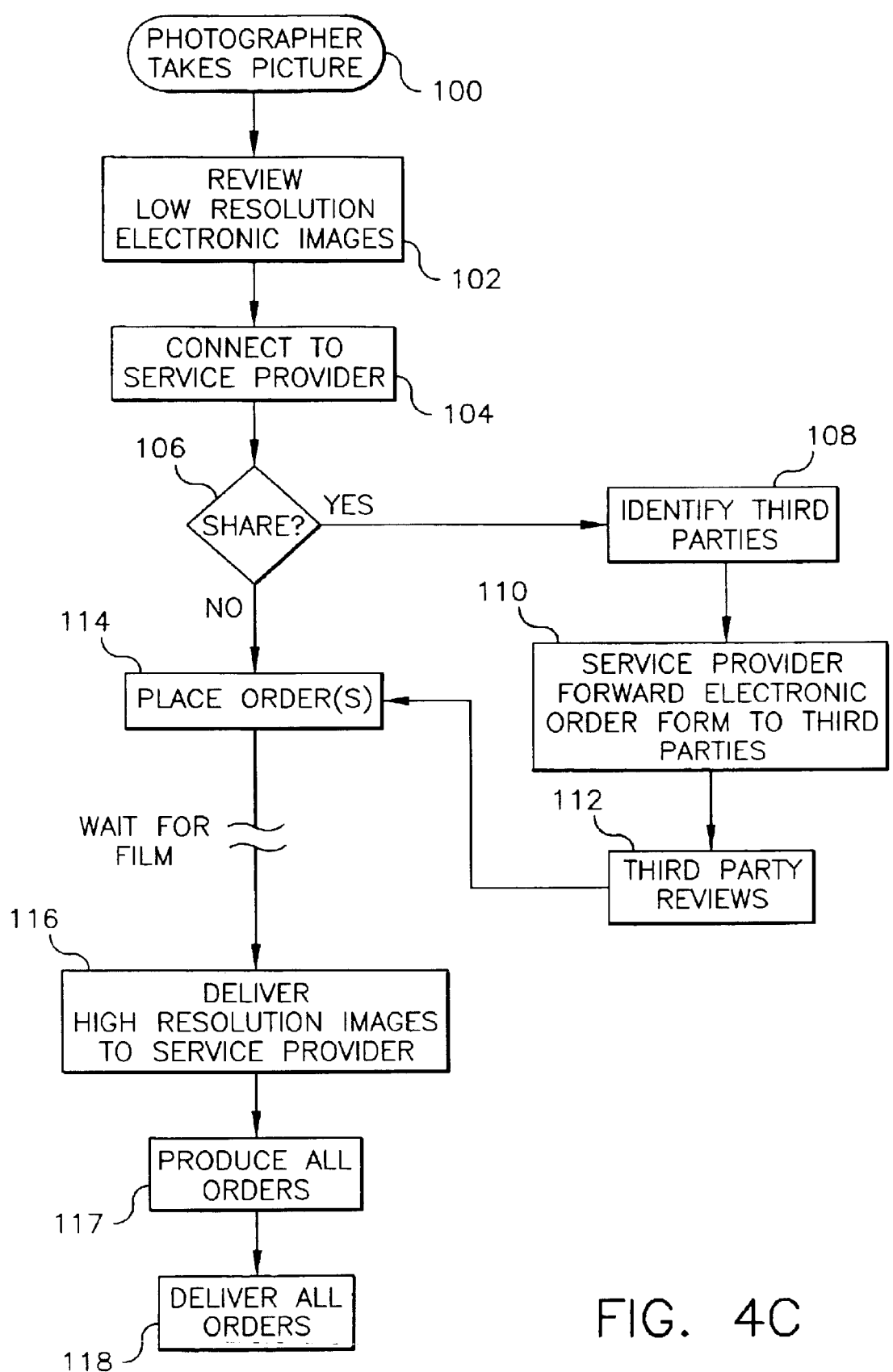
FIG. 4C is a flow chart showing another process for implementing the present invention.

Turning to FIG. 4C, the process begins with photographer 150 taking a picture in step 100. At a future point in time, the photographer 150 chooses to review the low resolution electronic images in step 102 with the display on the digital camera 152 or on the image display system 156. Deciding to order prints, photographer 150 connects to service provider 162 in step 104 and has to decide in step 106 whether he intends to share the pictures with third party 154. If so, he inputs the electronic addresses of the intended third parties 154 at step 108. This permits the service provider 162 to create an electronic order form in step 110 to forward to the identified third parties 154 on behalf of photographer 150. The forwarded electronic order form, typically in HTML or XML format, makes it very easy for third parties 154 to reply to and thus create a print order (step 114) with a minimal amount of work after reviewing the shared images on image display system 158 in step 112. It is important to note that the print order just created by third party 154 is in advance of service provider 162 receiving the high resolution electronic images from the digital camera 152. Creating the print order in this manner allows service provider 162 to produce the additional prints ordered by third party 154 at the same time as the original print order from photographer 150. This eliminates the need for sharing hardcopy prints and then reloading the high resolution electronic images to reorder prints at some future date thus saving the photographer 150 a lot of time.

Similarly in FIG. 4C, photographer 150 places his print order in step 114. After receiving the high resolution electronic images from the digital camera 152 in step 116, service provider 162 processes the print orders as stored in customer database 168 by correlating the unique code attached to the low resolution electronic images used to place the order with the uploaded high resolution electronic images which share the same code. Finally, again indexing the customer database 168 by the unique code, the service provider 162 sets up the delivery of the print order and delivers the print order in step 118 to the photographer 150 and third parties 154.

Figure 4D:
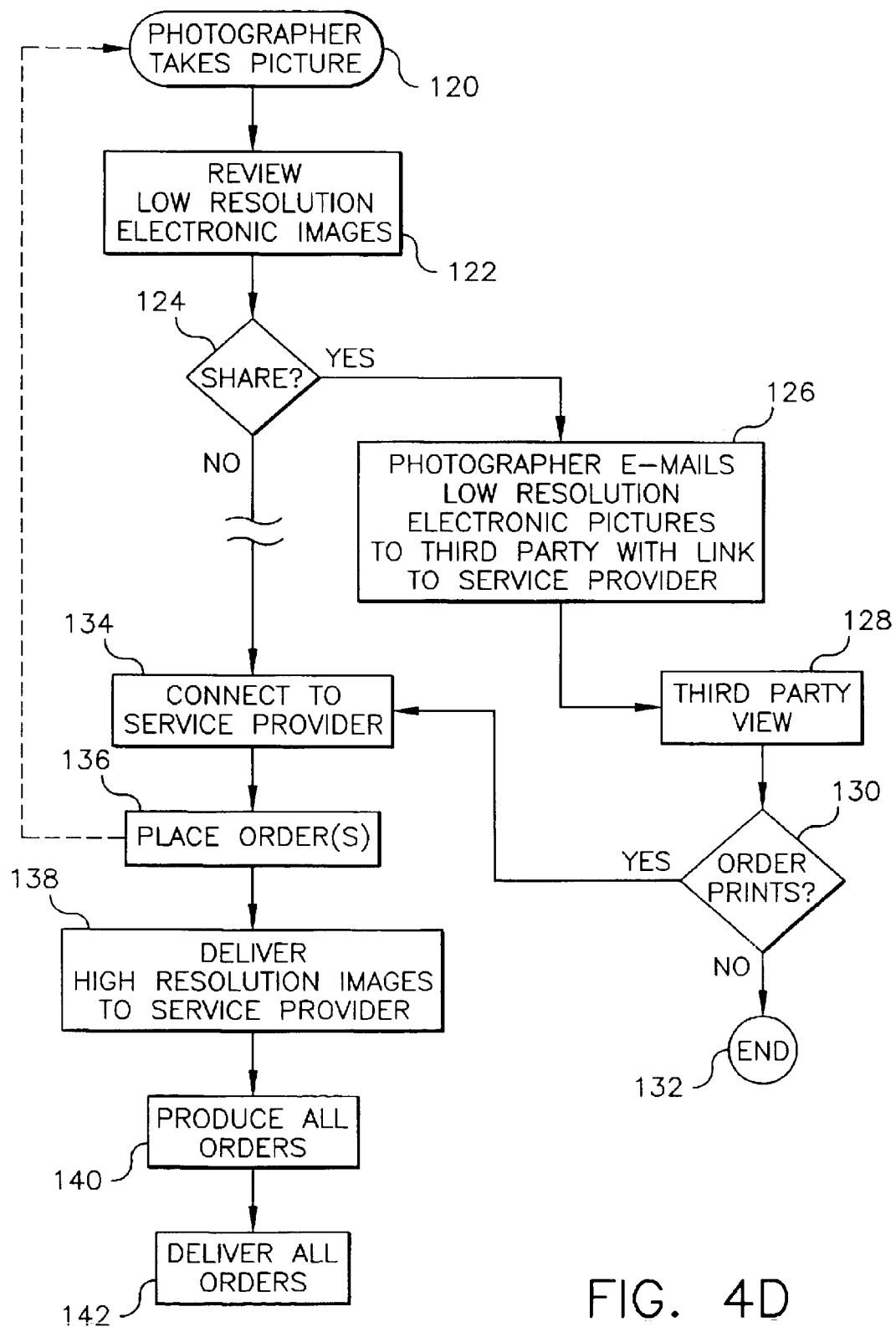
FIG. 4D is a flow chart showing another process for implementing the present invention.

Turning to FIG. 4D, the process begins with photographer 150 taking a picture in step 120. At a future point in time, the photographer 150 chooses to review the low resolution electronic images in step 122 with the display on the digital camera 152 or on the image display system 156. Deciding to share (step 124) these images with third party 154, photographer 150 attaches the low resolution electronic images to an email message to third party 154 in step 126. Upon receiving the email attachments, third party 154 views the low resolution electronic images on image display system 158 (step 128) and decides whether or not to order prints in step 130. If the decision is to order prints, third party 154 connects to the service provider 162 (step 134) which has been identified in the email message. An order is placed at step 136 by third party 154 and/or photographer 150.

Continuing with FIG. 4B at step 124, photographer 150 has decided not to share and connects to service provider 162 in step 134 and places an order in step 136 with the unique code identifying the high resolution electronic images to print. It is again important to note that the print order just created by third party 154 and/or photographer 150 is in advance of service provider 162 receiving the high resolution electronic images. Creating the print order in this manner allows service provider 162 to produce the additional prints ordered by third party 154 at the same time as the original print order from photographer 150. This eliminates the need for sharing hardcopy prints and then reloading the high resolution electronic images at some future date thus saving the photographer 150 a lot of time. After receiving the high resolution electronic images in step 138, service provider 162 produces the orders (step 140) using the unique code attached to the low resolution electronic images comprising the print order to correlate to the high resolution electronic images that are actually used to produce the print. Finally, again indexing the customer database 168 by the unique code attached to the low resolution electronic images, the service provider 162 sets up the delivery of the print order (s) and delivers the print order(s) in step 142 to the photographer 150 and third parties 154.

Referring to FIG. 5, there is illustrated a representation of an HTML order form is shown which is displayed on image display system 14. The form has four main sections 40, 42, 44, 46 for inputting information. The first section 40 contains information about the photographer 10 necessary to identify a shipping address, the human readable code 30 to identify the film cassette 26, and the credit card number used to purchase the goods and/or services such as prints. The second section 42 contains ordering information for the specific image and requested print size and quantity etc. The third section 44 provides the opportunity to order additional goods and services and the fourth section 46 provides the opportunity to list third parties 20 with whom images are to be shared.

In the event that the service provider 16 does not receive any order information from the third parties 20 identified in section 46, an automatic notification of intent to print the order can be communicated to the third parties 20 after a predetermined time, prompting them for a print order after which the opportunity will not exist. For example, they may decline participation, or place an order in the prescribed time frame.

The invention has been described in detail with particular reference to certain preferred embodiments thereof, but it will be understood that variations and modifications can be effected within the spirit and scope of the invention.

PARTS LIST 10 photographer
12 hybrid camera
13 server
14 image display system
15 film processing block
16 service provider
17 film scanning block
19 Internet
20 third party
21 computer
23 customer database
24 image database
26 film cassette
28 machine readable code
30 human readable code
34 optical exposing assembly
36 optical assembly 38 image display system
40 section
42 section
44 section
46 section
50 step
54 step
56 step
58 step
60 step
62 step
64 step
66 step
68 step
70 step
72 step
74 step
76 step
78 step
80 step
82 step
84 step
88 step
90 step
92 step
94 step
96 step
102 step
104 step
106 step
108 step
110 step
112 step
114 step
116 step
118 step
120 step
122 step
124 step
126 step
128 step
130 step
134 step
136 step
138 step
140 step
142 step
150 photographer
152 digital camera
153 optical assembly
154 third party
156 image display system
158 image display system
160 computer
162 service provider
164 server
166 image database
168 customer database

What is claimed is:

1. A method of providing image goods and/or services to more than one party located at different locations, comprising the steps of:

capturing substantially simultaneously an image both electronically and on a photosensitive media by a customer using a camera;

transmitting via a computer network said electronic image to a third party at a location remote from said customer along with additional data, said additional data identifying said image with respect to said photosensitive media;

placing an order via a computer network by said customer and/or said third party with a service provider for at least one good and/or service with respect to said image on said associated photosensitive media associated using said electronic image prior to said service provider receiving said photosensitive media; and assembling by said service provider said order upon receipt of the photosensitive media.

2. A method according to claim 1 wherein said additional data comprises a database location at which said order may be electronically accessed by said service provider for determining if additional orders exist with respect to said images.

3. A method according to claim 1 wherein said customer advises said service provider that said image has been forwarded to said third party for potential placement of an order with respect to said image.

4. A method according to claim 3 wherein said customer forwards to said service provider the e-mail address of said third party to which said digital image has been forwarded.

5. A method according to claim 4 wherein said service provider forwards electronically to said customer and said third party confirmation that said order has been received.

6. A method according to claim 1 wherein said customer provides a predetermined amount of credit which may be charged to said customer with respect to the ordering of goods and/or services by said third party.

7. A method according to claim 1 wherein said information forwarded to said third party further includes a computer software program whereby the order can be automatically forwarded to said service provider by said third party by selecting from pre-designated options provided in addition to said images.

8. A method of providing image goods from a service provider and/or services to a plurality of customers located at different locations, comprising;

capturing substantially simultaneously an image both electronically and on a photosensitive media by a customer using a camera, said electronic image comprising a predetermined image resolution, said camera having a selection switch that results in the creation of identifying data that identities that digital images are or have been forwarded to a third party for ordering of goods and/or services made using said photosensitive media;

forwarding via a computer network said identifying data to said service provider prior to execution of providing goods and/or services with respect to images on said photosensitive media;

transmitting via a computer network said electronic images to said third party along with said identifying data with respect to said images transmitted; and placing an order by said third party for goods and/or services with respect to said images on said photosensitive media using said identifying data and said digital images from which the order may be placed.

* * * * *